US012402223B2

(12) United States Patent
Peng

(10) Patent No.: US 12,402,223 B2
(45) Date of Patent: Aug. 26, 2025

(54) LIGHT-EMITTING DIODE LAMP STRING SYSTEM

(71) Applicant: SEMISILICON TECHNOLOGY CORP., New Taipei (TW)

(72) Inventor: Wen-Chi Peng, New Taipei (TW)

(73) Assignee: SEMISILICON TECHNOLOGY CORP., New Taipei (TW)

( * ) Notice: Subject to any disclaimer, the term of this patent is extended or adjusted under 35 U.S.C. 154(b) by 141 days.

(21) Appl. No.: 18/517,324

(22) Filed: Nov. 22, 2023

(65) Prior Publication Data

US 2025/0168949 A1 May 22, 2025

(51) Int. Cl.

*H05B 45/44* (2020.01)
*H05B 45/10* (2020.01)
*H05B 45/3725* (2020.01)
*H05B 45/395* (2020.01)
*H05B 47/105* (2020.01)

(52) U.S. Cl.

CPC ........... *H05B 45/44* (2020.01); *H05B 45/395* (2020.01)

(58) Field of Classification Search

CPC .... H05B 45/10; H05B 45/3725; H05B 45/46; H05B 45/38; H05B 45/44; H05B 45/385; H05B 45/48; H05B 45/375; H05B 45/325; H05B 45/20; H05B 45/395; H05B 45/50; H05B 45/59; H05B 45/56; H05B 45/36; H05B 45/37; H05B 45/12

See application file for complete search history.

(56) References Cited

U.S. PATENT DOCUMENTS

| | | | | |
|---|---|---|---|---|
| 8,928,233 B1 * | 1/2015 | Peng | H05B 45/44 315/192 |
| 10,070,489 B1 * | 9/2018 | Galvano | H05B 45/10 |
| 10,716,184 B1 * | 7/2020 | Pu | H05B 45/375 |
| 10,791,604 B2 * | 9/2020 | Peng | H05B 45/00 |

(Continued)

FOREIGN PATENT DOCUMENTS

| | | |
|---|---|---|
| TW | 201318469 A | 5/2013 |
| TW | 201318481 A | 5/2013 |
| TW | 201505484 A | 2/2015 |

OTHER PUBLICATIONS

Office Action dated May 2, 2024 of the corresponding Taiwan patent application No. 112139842.

*Primary Examiner* — Wei (Victor) Y Chan

(74) *Attorney, Agent, or Firm* — MUNCY, GEISSLER, OLDS & LOWE, P.C.

(57) ABSTRACT

A light-emitting diode lamp string system includes a light-emitting diode lamp string and a control apparatus. The light-emitting diode lamp string includes a plurality of light-emitting diode lamps. The light-emitting diode lamp includes a first controller, a power circuit, an impedance-balancing unit, and a plurality of light-emitting diodes. The control apparatus is used to receive a direct-current power and includes a controller, a controlled switch, and an impedance component. When the controller performs a lighting mode, the controller switches the controlled switch to turn on or off the controlled switch. The impedance-balancing unit adjusts an impedance of the light-emitting diode lamp to a fixed impedance based on the direct-current power received by the light-emitting diode lamp, so that a voltage of each of the light-emitting diode lamps is similar.

10 Claims, 7 Drawing Sheets

(56) References Cited

U.S. PATENT DOCUMENTS

| | | | | |
|---|---|---|---|---|
| 11,297,704 | B2 * | 4/2022 | Zhu | H05B 45/3575 |
| 2012/0098442 | A1 | 4/2012 | Jin | |
| 2016/0050725 | A1 * | 2/2016 | Johnston | H05B 45/54<br>315/307 |
| 2018/0376555 | A1 * | 12/2018 | Wang | H05B 45/20 |
| 2022/0201817 | A1 * | 6/2022 | Zhou | H05B 45/30 |

* cited by examiner

LIGHT-EMITTING DIODE LAMP STRING SYSTEM

BACKGROUND OF THE DISCLOSURE

Technical Field

The present disclosure relates to a light-emitting diode lamp string, and especially relates to a light-emitting diode lamp string system.

Description of Related Art

Due to the high luminous efficiency, low power consumption, long life, fast response speed, and high reliability of the light-emitting diodes, the light-emitting diodes have been widely used in many light-emitting products, such as the light-emitting diode lamp which includes a plurality of the light-emitting diodes, and the light-emitting diode lamp string which includes a plurality of the light-emitting diode lamps.

Moreover, the lighting control of each light-emitting diode requires external control instructions to change the lighting mode based on the instruction content. However, in order to generate the control instructions, complicated electronic circuits are used in the lamp string controller, which further increase the production cost.

Moreover, the brightness of the light-emitting diode is determined by the current flowing through the light-emitting diode. If the current flowing through the light-emitting diode is greater, the light-emitting diode is brighter. If the current flowing through the light-emitting diode is smaller, the brightness of the light-emitting diode is dimmer. It may be known from Ohm's law that the magnitude of the current is determined by the operating voltage received by the light-emitting diode lamp string. If the operating voltage is higher, the current flowing through the light-emitting diode lamp string is greater. If the operating voltage is lower, the current flowing through the light-emitting diode lamp string is smaller.

However, the light-emitting diode lamp string includes a plurality of light-emitting diode lamps. Because the paths of the light-emitting diode lamp string transmitting the operating voltage to the light-emitting diode lamps have line losses, the operating voltage received by each light-emitting diode lamp may be different due to the line losses, resulting in uneven brightness of each light-emitting diode lamp.

SUMMARY OF THE DISCLOSURE

In order to solve the above-mentioned problems, an object of the present disclosure is to provide a light-emitting diode lamp string system.

In order to achieve the object of the present disclosure mentioned above, the light-emitting diode lamp string system of the present disclosure includes a light-emitting diode lamp string and a control apparatus. The light-emitting diode lamp string includes a plurality of light-emitting diode lamps which are electrically connected to each other. Moreover, each of the light-emitting diode lamps includes a first controller and a plurality of light-emitting diodes which are electrically connected to the first controller respectively. The control apparatus is used to receive a direct-current power and includes a controller, a power circuit, a controlled switch, and an impedance component. The controlled switch is electrically connected to the controller and is arranged on the power circuit to form a first loop. The impedance component is connected across the controlled switch and is arranged on the power circuit to form a second loop. The control apparatus is electrically connected to the light-emitting diode lamp string through the power circuit. Moreover, when the controller performs a lighting mode, the controller switches the controlled switch to turn on or off the controlled switch, so that when the controlled switch is turned on, a first voltage is formed from the direct-current power through the first loop, and when the controlled switch is turned off, a second voltage is formed from the direct-current power through the second loop, wherein the first voltage and the second voltage have a voltage difference and form a lighting signal. The first controller of each of the light-emitting diode lamps identifies the lighting signal to drive each of the light-emitting diodes to operate based on the lighting signal. Moreover, each of the light-emitting diode lamps further includes an impedance-balancing unit which is electrically connected to the first controller and the light-emitting diode. Moreover, the impedance-balancing unit adjusts an impedance of the light-emitting diode lamp to a fixed impedance based on the direct-current power received by the light-emitting diode lamp, so that a voltage of each of the light-emitting diode lamps is similar (or identical).

Moreover, in an embodiment of the light-emitting diode lamp string system of the present disclosure mentioned above, the impedance component is a resistor, a variable resistor, or a Zener diode.

Moreover, in an embodiment of the light-emitting diode lamp string system of the present disclosure mentioned above, each of the light-emitting diode lamps further includes a plurality of first switches, a linear controller, a positive terminal, and a negative terminal. Each of the first switches is electrically connected to the first controller and the light-emitting diode respectively. The linear controller is electrically connected to the first controller and the light-emitting diode. The positive terminal is electrically connected to the first controller, the light-emitting diode, and the linear controller. The negative terminal is electrically connected to the first controller, the first switch, and the linear controller. Moreover, each of the light-emitting diodes includes an anode terminal and a cathode terminal. The anode terminal is electrically connected to the first controller and the linear controller. The cathode terminal is electrically connected to the first switch. Moreover, the linear controller linearly adjusts the direct-current power received from the positive terminal so that a current flowing through the light-emitting diode lamp is a fixed current, so that a brightness of the light-emitting diode corresponds to the fixed current and is a fixed brightness.

Moreover, in an embodiment of the light-emitting diode lamp string system of the present disclosure mentioned above, each of the light-emitting diode lamps further includes a plurality of the impedance-balancing units. Each of the impedance-balancing units is electrically connected to the light-emitting diode lamp and the first controller respectively. The first controller identifies the lighting signal to generate a first control signal based on the lighting signal and transmits the first control signal to each of the first switches to turn on or off each of the first switches to turn on or off each of the light-emitting diodes. The impedance-balancing unit is controlled by the first controller to have a first equivalent impedance. When the first controller turns on the first switch, the light-emitting diode and the first switch have a second equivalent impedance. When the first controller turns off the first switch, the impedance-balancing unit is synchronously controlled to provide the first equivalent impedance equivalent to the second equivalent impedance to perform an impedance compensation.

Moreover, in an embodiment of the light-emitting diode lamp string system of the present disclosure mentioned above, each of the impedance-balancing units includes an inverting circuit and a bypass switch. The inverting circuit is electrically connected to the first controller. The bypass switch is electrically connected to the inverting circuit, the first controller, and the light-emitting diode. Moreover, the first controller turns on or off the bypass switch oppositely to the first switch through the inverting circuit, so that when the first controller turns off the first switch, the impedance-balancing unit provides the first equivalent impedance equivalent to the second equivalent impedance to perform the impedance compensation.

Moreover, in an embodiment of the light-emitting diode lamp string system of the present disclosure mentioned above, based on driving each of the light-emitting diodes to operate, the first controller of each of the light-emitting diode lamps synchronously controls each of the impedance-balancing units to perform the impedance compensation, to fix the first voltage which is supplied from the direct-current power to the light-emitting diode lamp through the first loop. When the first controller turns on the first switch, a first current from the anode terminal of the light-emitting diode to the cathode terminal of the light-emitting diode is generated. The linear controller controls a cross voltage between the positive terminal and the negative terminal to be a fixed voltage, to control the first current to be fixed, so that the brightness of the light-emitting diode corresponds to the fixed current and is the fixed brightness.

Moreover, in an embodiment of the light-emitting diode lamp string system of the present disclosure mentioned above, the linear controller includes a voltage-dividing circuit, a transistor, and an amplifier. The voltage-dividing circuit is electrically connected to the first controller, the light-emitting diode, the first switch, the bypass switch, the positive terminal, and the negative terminal, and generates a divided voltage based on the lighting signal. The transistor is coupled between the voltage-dividing circuit and a ground terminal. The amplifier is electrically connected to the voltage-dividing circuit and the transistor. Moreover, the amplifier includes a first input terminal, a second input terminal, and an output terminal. The first input terminal is electrically connected to the voltage-dividing circuit to receive the divided voltage. The second input terminal receives a reference voltage. The output terminal is electrically connected to the transistor. Moreover, the amplifier provides a second control signal to the transistor based on the divided voltage and the reference voltage to fix a size of a channel of the transistor. The amplifier adjusts a potential of the negative terminal based on a second current flowing through the transistor, to maintain the cross voltage at the fixed voltage by adjusting the potential of the negative terminal.

Moreover, in an embodiment of the light-emitting diode lamp string system of the present disclosure mentioned above, the linear controller further includes a constant voltage source and a voltage follower. The constant voltage source generates a constant voltage. The voltage follower is electrically connected to the constant voltage source and the second input terminal of the amplifier. Moreover, the voltage follower electrically isolates and amplifies the constant voltage to generate the reference voltage corresponding to the constant voltage. The voltage follower transmits the reference voltage to the amplifier through the second input terminal of the amplifier.

Moreover, in an embodiment of the light-emitting diode lamp string system of the present disclosure mentioned above, the voltage-dividing circuit includes a first voltage-dividing resistor and a second voltage-dividing resistor. The first voltage-dividing resistor is electrically connected to the first controller, the light-emitting diode, the bypass switch, the positive terminal, and the first input terminal of the amplifier. The second voltage-dividing resistor is electrically connected to the first voltage-dividing resistor, the first input terminal of the amplifier, the transistor, the first controller, the first switch, the bypass switch, and the negative terminal.

Moreover, in an embodiment of the light-emitting diode lamp string system of the present disclosure mentioned above, each of the impedance-balancing units further includes an equivalent diode impedance component electrically connected to the first controller, the light-emitting diode, and the bypass switch.

The advantage of the present disclosure is to improve the problem that the controller in the light-emitting diode lamp string includes complicated circuits for generating the lighting signal, and to improve the problem that the brightness of each of the light-emitting diode lamps is uneven.

Please refer to the detailed descriptions and figures of the present disclosure mentioned below for further understanding technologies, methods, and effects and achieving the predetermined purposes of the present disclosure. Further, the purposes, characteristics, and features of the present disclosure may be more deeply and specifically understood. However, the drawings are provided only for references and descriptions and not intended to limit the scope of the present disclosure.

DETAILED DESCRIPTION

In the present disclosure, numerous specific details are provided, to provide a comprehensive understanding of embodiments of the present disclosure. However, those skilled in the art may understand that the present disclosure may be practiced without one or more of these specific details. In other instances, well-known details are not shown or described to avoid obscuring features of the present disclosure. The technical content and the detailed description of the present disclosure are as follows with reference to the figures.

Figure 1:
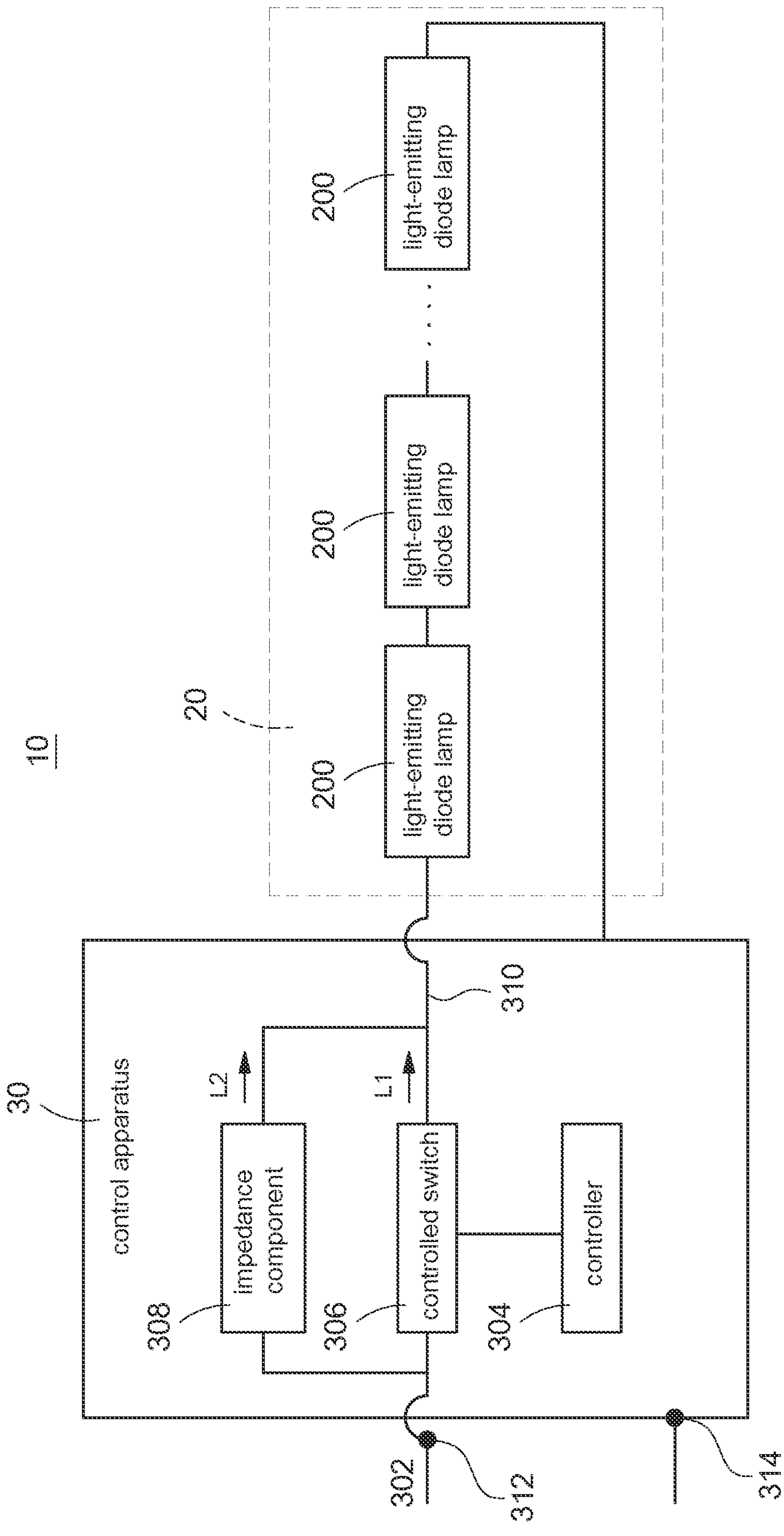
FIG. 1 shows a block diagram of a light-emitting diode lamp string system according to the first embodiment of the present disclosure.

FIG. 1 shows a block diagram of a light-emitting diode lamp string system 10 according to the first embodiment of the present disclosure. The light-emitting diode lamp string system 10 of the present disclosure includes a light-emitting diode lamp string 20 and a control apparatus 30. The light-emitting diode lamp string 20 includes a plurality of light-emitting diode lamps 200. The control apparatus 30 includes a controller 304, a power circuit 310, a controlled switch 306, and an impedance component 308. The power circuit 310 at least includes a voltage positive terminal 312 and a voltage negative terminal 314. The above-mentioned components are electrically connected to each other, and the light-emitting diode lamps 200 shown in FIG. 1 are connected to each other in series.

The control apparatus 30 is used to receive a direct-current power 302. The controlled switch 306 is arranged on the power circuit 310 to form a first loop L1. The impedance component 308 is connected across the controlled switch 306 and is arranged on the power circuit 310 to form a second loop L2. The impedance component 308 is a resistor, a variable resistor, or a Zener diode. In FIG. 1, the controlled switch 306 is a P-type metal-oxide-semiconductor field effect transistor (P-MOSFET), and the controlled switch 306 and the impedance component 308 are arranged at the voltage positive terminal 312.

Figure 2:
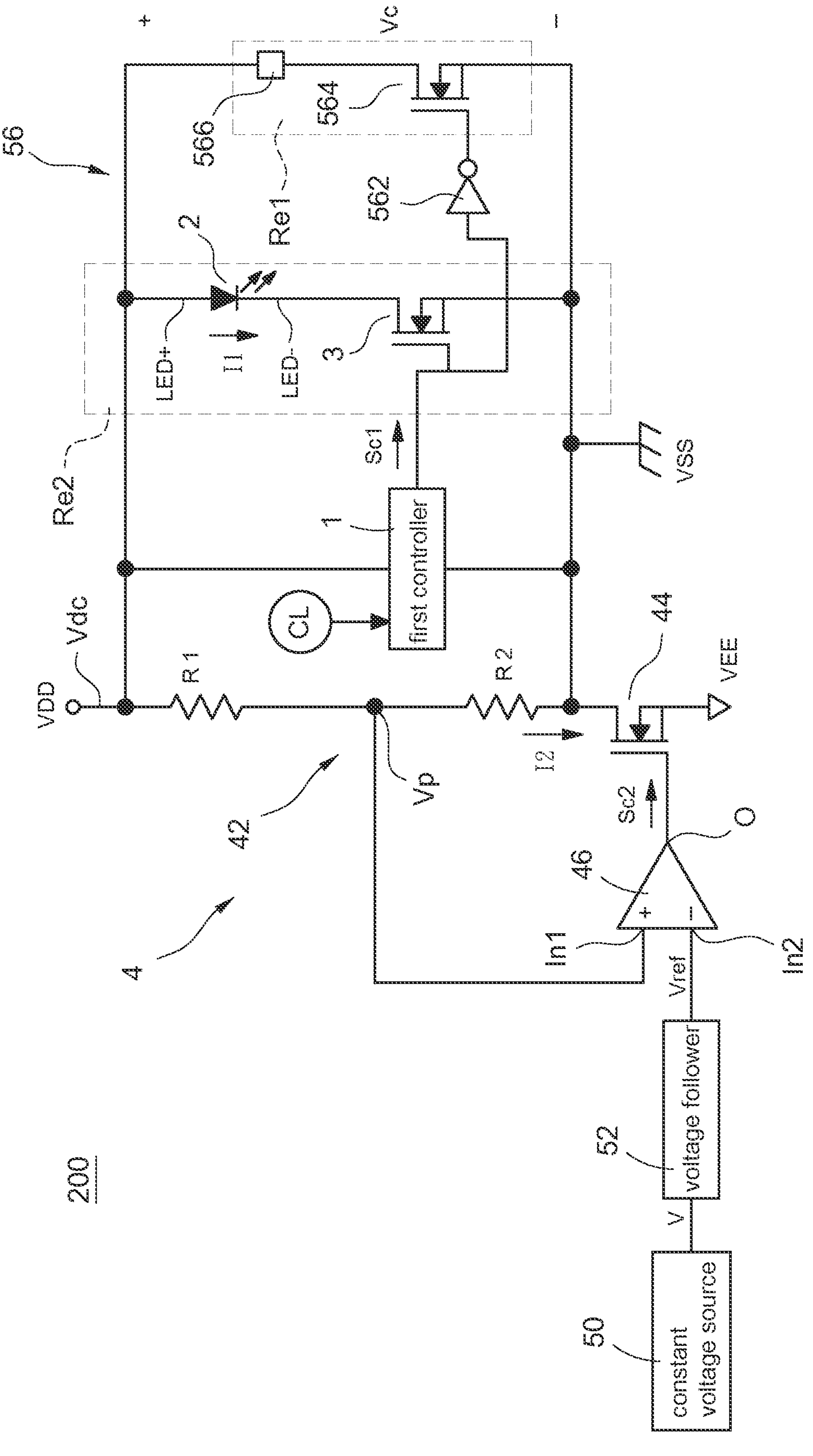
FIG. 2 shows a circuit block diagram of a light-emitting diode lamp according to an embodiment of the present disclosure.

FIG. 2 shows a circuit block diagram of the light-emitting diode lamp 200 according to an embodiment of the present disclosure. The descriptions of the elements shown in FIG. 2 which are the same as the elements shown in FIG. 1 are not repeated here for brevity. The circuit of FIG. 2 is used when the light-emitting diode lamps 200 are connected to each other in series. Each of the light-emitting diode lamps 200 includes a first controller 1, a plurality of impedance-balancing units 56 (wherein only one impedance-balancing unit 56 is shown in FIG. 2 for brevity), a plurality of light-emitting diodes 2 (wherein only one light-emitting diode 2 is shown in FIG. 2 for brevity), a plurality of first switches 3 (wherein only one first switch 3 is shown in FIG. 2 for brevity), a linear controller 4, a clock signal generator CL, a positive terminal VDD, and a negative terminal VSS. Each of the impedance-balancing units 56 includes an inverting circuit 562, a bypass switch 564, and an equivalent diode impedance component 566. Each of the light-emitting diodes 2 includes an anode terminal LED+ and a cathode terminal LED−. The linear controller 4 includes a voltage-dividing circuit 42, a transistor 44, an amplifier 46, a constant voltage source 50, and a voltage follower 52. The amplifier 46 includes a first input terminal In1, a second input terminal In2, and an output terminal O. The voltage-dividing circuit 42 includes a first voltage-dividing resistor R1 and a second voltage-dividing resistor R2. The above-mentioned components are electrically connected to each other. The transistor 44 is coupled between the voltage-dividing circuit 42 and a ground terminal VEE. The impedance-balancing unit 56 adjusts an impedance of the light-emitting diode lamp 200 to a fixed impedance based on the direct-current power 302 received by the light-emitting diode lamp 200, so that a voltage of each of the light-emitting diode lamps 200 is similar.

Figure 3:
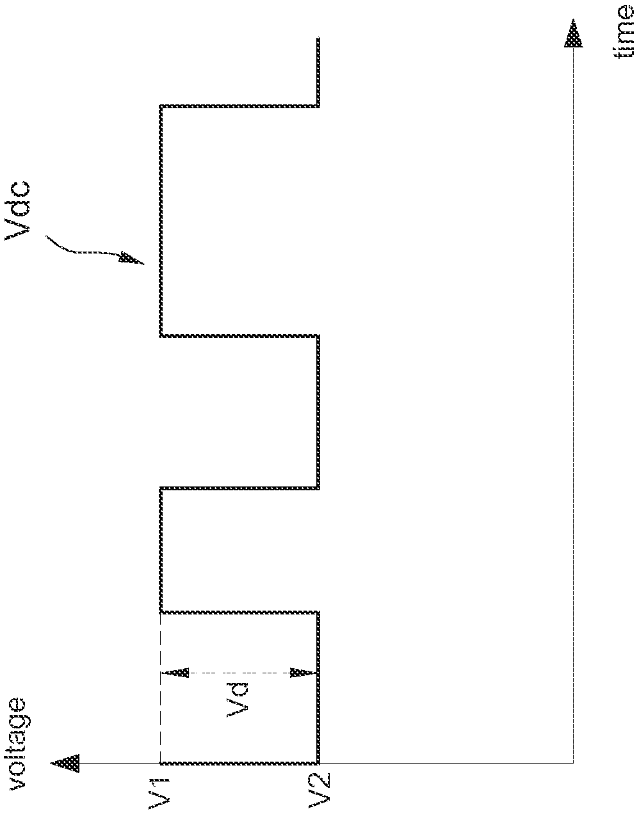
FIG. 3 shows a waveform diagram of a lighting signal according to an embodiment of the present disclosure.

FIG. 3 shows a waveform diagram of a lighting signal Vdc according to an embodiment of the present disclosure. Please also refer to FIG. 1 and FIG. 2. When the controller 304 performs a lighting mode, the controller 304 switches the controlled switch 306 to turn on or off the controlled switch 306, so that when the controlled switch 306 is turned on, a first voltage V1 is formed from the direct-current power 302 through the first loop L1, and when the controlled switch 306 is turned off, a second voltage V2 is formed from the direct-current power 302 through the second loop L2, wherein the first voltage V1 and the second voltage V2 have a voltage difference Vd and form the lighting signal Vdc. The first controller 1 of each of the light-emitting diode lamps 200 identifies the lighting signal Vdc to drive each of the light-emitting diodes 2 to operate based on the lighting signal Vdc. Based on driving each of the light-emitting diodes 2 to operate, the first controller 1 of each of the light-emitting diode lamps 200 synchronously controls each of the impedance-balancing units 56 to perform an impedance compensation, to fix the first voltage V1 which is supplied from the direct-current power 302 to the light-emitting diode lamp 200 through the first loop L1.

The first controller 1 of each of the light-emitting diode lamps 200 identifies the lighting signal Vdc to generate a first control signal Sc1 based on the lighting signal Vdc and transmits the first control signal Sc1 to each of the first switches 3 to turn on or off each of the first switches 3 to turn on or off each of the light-emitting diodes 2. The impedance-balancing unit 56 is controlled by the first controller 1 to have a first equivalent impedance Re1. When the first controller 1 turns on the first switch 3, the light-emitting diode 2 and the first switch 3 have a second equivalent impedance Re2. When the first controller 1 turns off the first switch 3, the impedance-balancing unit 56 is synchronously controlled by the first controller 1 to provide the first equivalent impedance Re1 equivalent to the second equivalent impedance Re2 to perform the impedance compensation. The equivalent diode impedance component 566 (for example, a diode) may make the first equivalent impedance Re1 more accurately equivalent to the second equivalent impedance Re2.

The first controller 1 turns on or off the bypass switch 564 oppositely to the first switch 3 through the inverting circuit 562, so that when the first controller 1 turns off the first switch 3, the impedance-balancing unit 56 provides the first equivalent impedance Re1 equivalent to the second equivalent impedance Re2 to perform the impedance compensation.

Moreover, because the linear controller 4 has the function of linearly adjusting and controlling the input power when the input power changes and maintaining the power passing through the light-emitting diode lamp 200 as a constant power (such as a constant voltage or a constant current), when the direct-current power 302 received from the positive terminal Vdd changes, the linear controller 4 linearly adjusts the direct-current power 302 so that the current passing through the light-emitting diode lamp 200 is a fixed current, so that a brightness of the light-emitting diode 2 corresponds to the fixed current and is a fixed brightness. The specific content is described in detail below.

When the first controller 1 turns on the first switch 3, a first current I1 from the anode terminal LED+ of the light-emitting diode 2 to the cathode terminal LED− of the light-emitting diode 2 is generated. The linear controller 4 controls a cross voltage Vc between the positive terminal VDD and the negative terminal VSS to be a fixed voltage, to control the first current I1 to be fixed, so that the brightness of the light-emitting diode 2 corresponds to the fixed current and is the fixed brightness.

The voltage-dividing circuit 42 generates a divided voltage Vp based on the lighting signal Vdc. The constant voltage source 50 generates a constant voltage V. The voltage follower 52 electrically isolates and amplifies the constant voltage V to generate a reference voltage Vref corresponding to the constant voltage V. The voltage follower 52 transmits the reference voltage Vref to the amplifier 46 through the second input terminal In2 of the amplifier 46. The second input terminal In2 receives the reference voltage Vref. The amplifier 46 provides a second control signal Sc2 with linear variation characteristics to the transistor 44 based on the divided voltage Vp and the reference voltage Vref to fix a size of a channel of the transistor 44. In other words, the channel of the transistor 44 is controlled in the linear region based on the linear variation characteristics of the second control signal Sc2. A potential of the negative terminal VSS is adjusted through the size of the channel of the transistor 44, so that the cross voltage Vc is maintained at the fixed voltage by adjusting the potential of the negative terminal VSS. Specifically, since the second control signal Sc2 controls the gate-source voltage (commonly referred to as Vgs) of the transistor 44 to be fixed, the drain-source voltage (commonly referred to as Vds) of the transistor 44 is affected by a second current I2 (namely, the drain current, commonly referred to as Id) flowing through the transistor 44, so that the potential of the negative terminal VSS is adjusted. Therefore, by adjusting the potential of the negative terminal VSS, the cross voltage Vc between the positive terminal VDD and the negative terminal VSS may be maintained at the fixed voltage (for example but not limited to 3 volts), and further the first current I1 is controlled to be fixed.

Figure 4:
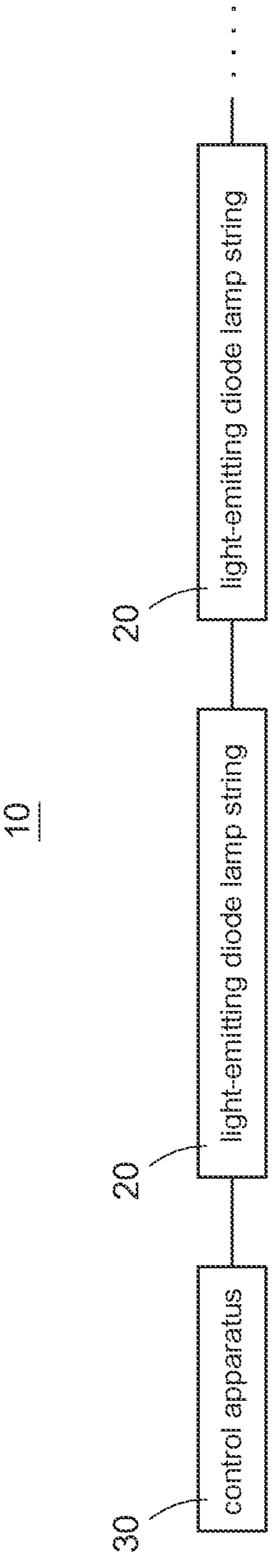
FIG. 4 shows a block diagram of the light-emitting diode lamp string system according to the second embodiment of the present disclosure.

FIG. 4 shows a block diagram of the light-emitting diode lamp string system 10 according to the second embodiment of the present disclosure. The descriptions of the elements shown in FIG. 4 which are the same as the elements shown in FIG. 1 are not repeated here for brevity. The light-emitting diode lamp string system 10 shown in FIG. 4 includes a plurality of the light-emitting diode lamp strings 20 connected to each other.

Figure 5:
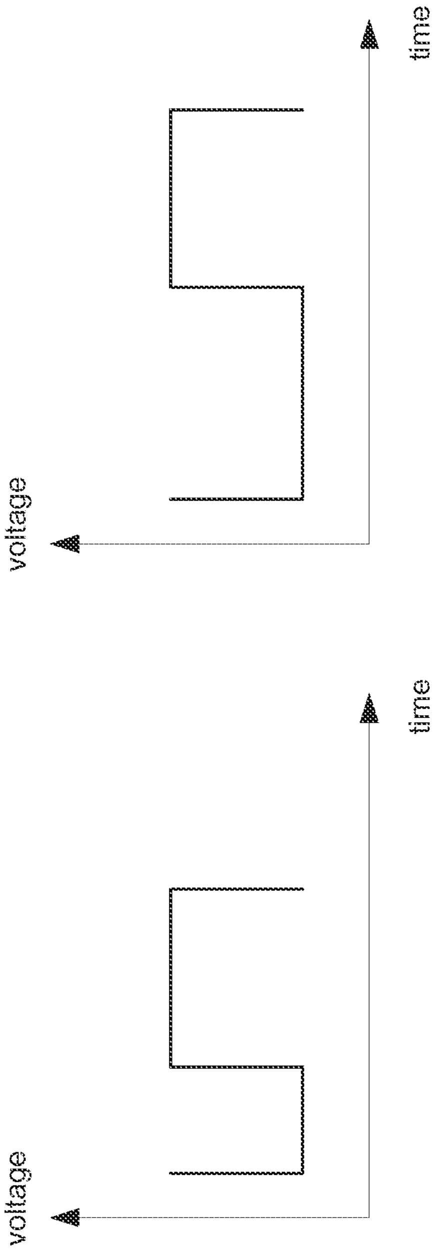
FIG. 5 shows a waveform diagram of the lighting signal being identified as 0 or 1 according to an embodiment of the present disclosure.

FIG. 5 shows a waveform diagram of the lighting signal Vdc being identified as 0 or 1 according to an embodiment of the present disclosure. Please also refer to FIG. 1, FIG. 2, and FIG. 3. Through the aforementioned divided voltage and the use of the amplifier 46, the first controller 1 uses the clock provided by the clock signal generator CL to determine the duration of the waveform of the lighting signal Vdc, thereby reading the carrier signal (namely, the lighting signal Vdc) to determine 0 and 1 of the lighting signal Vdc. For example, the waveform on the left in FIG. 5 represents 0, while the waveform on the right represents 1.

Figure 6:
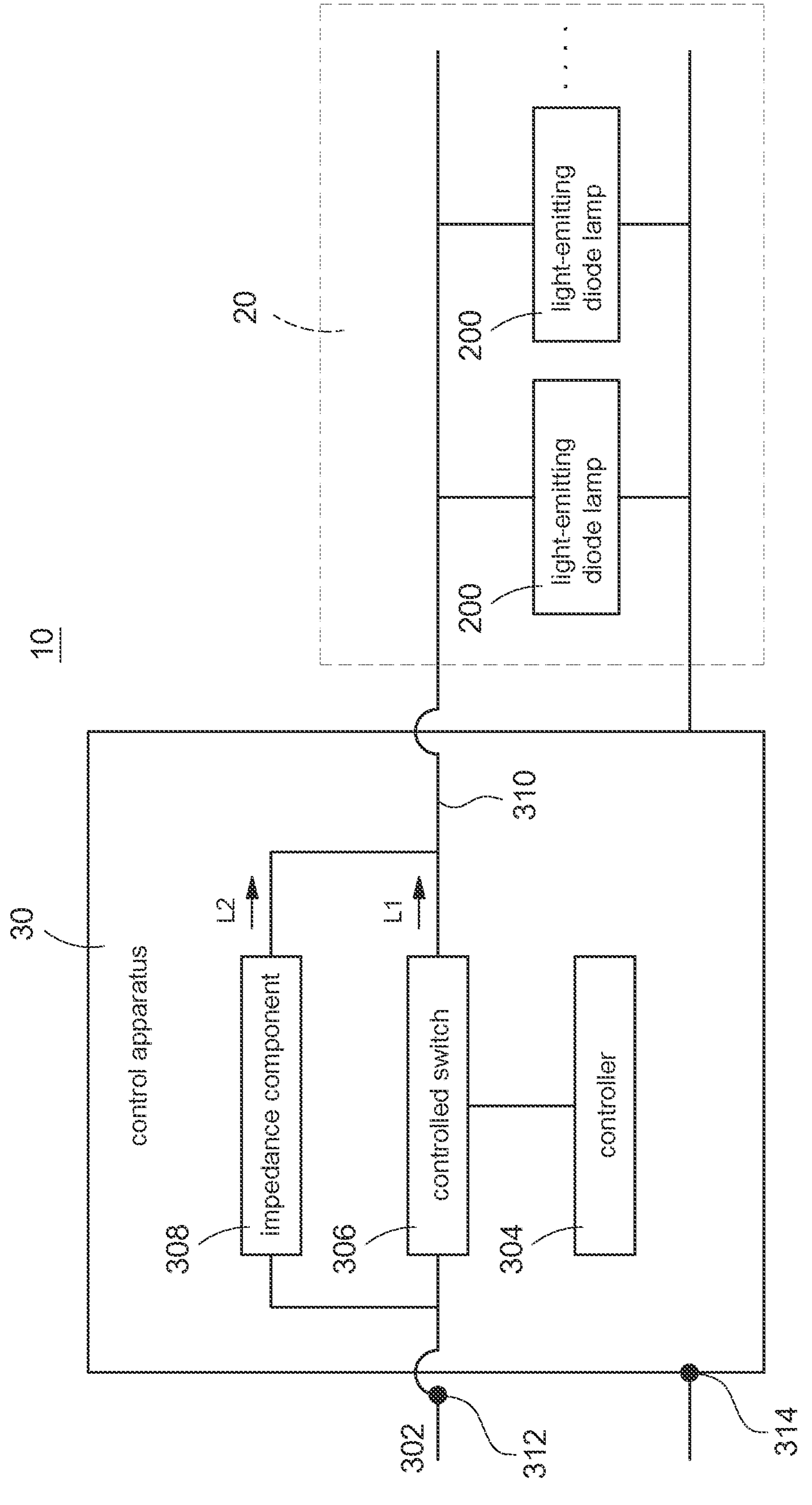
FIG. 6 shows a block diagram of the light-emitting diode lamp string system according to the third embodiment of the present disclosure.

FIG. 6 shows a block diagram of the light-emitting diode lamp string system 10 according to the third embodiment of the present disclosure. The descriptions of the elements shown in FIG. 6 which are the same as the elements shown in FIG. 1 are not repeated here for brevity. In FIG. 6, the light-emitting diode lamps 200 are connected in parallel with each other.

Figure 7:
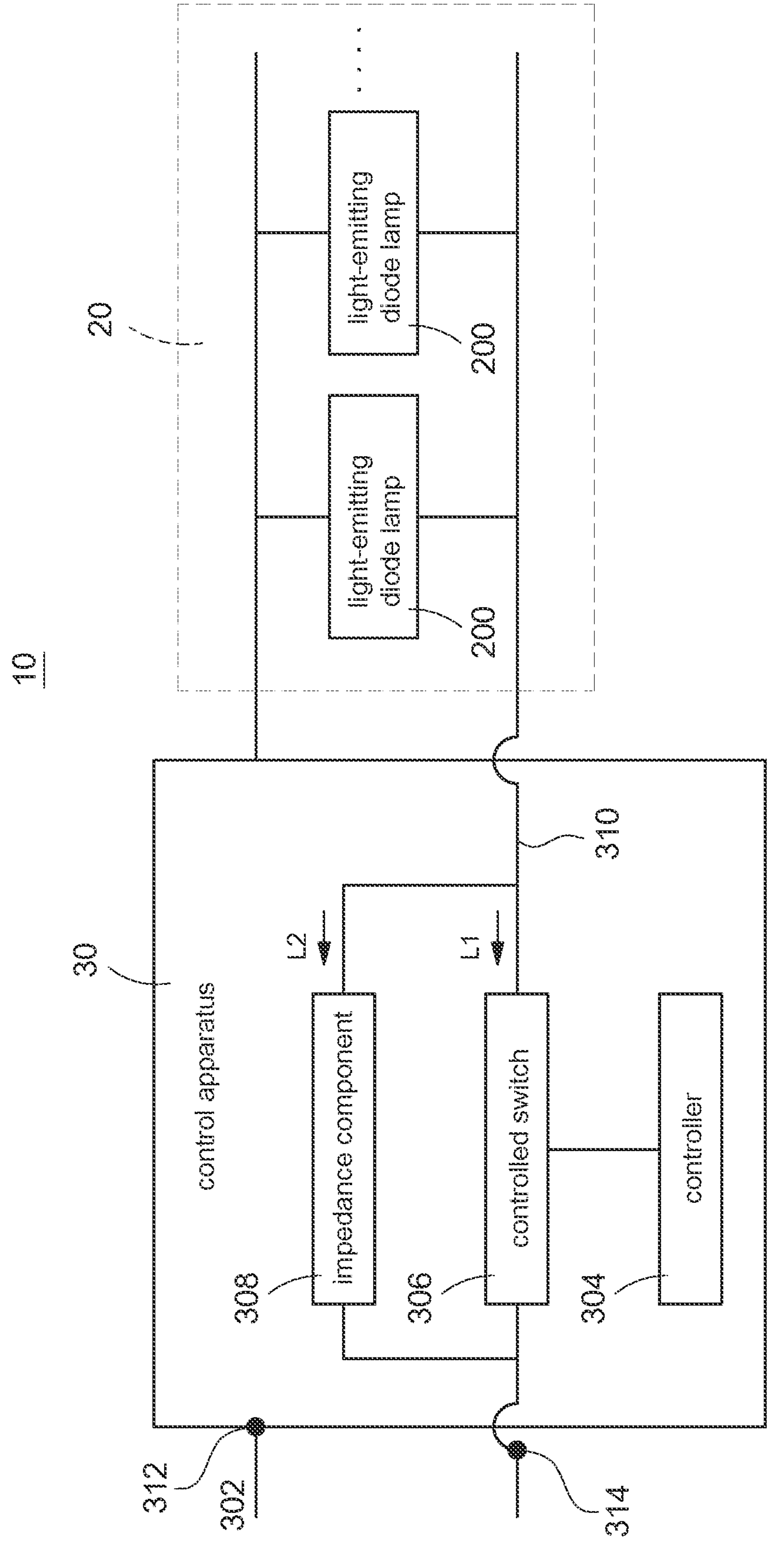
FIG. 7 shows a block diagram of the light-emitting diode lamp string system according to the fourth embodiment of the present disclosure.

FIG. 7 shows a block diagram of the light-emitting diode lamp string system 10 according to the fourth embodiment of the present disclosure. The descriptions of the elements shown in FIG. 7 which are the same as the elements shown in FIG. 6 are not repeated here for brevity. In FIG. 7, the controlled switch 306 is an N-type metal-oxide-semiconductor field effect transistor (N-MOSFET), and the controlled switch 306 and the impedance component 308 are arranged at the voltage negative terminal 314.

Figure 8:
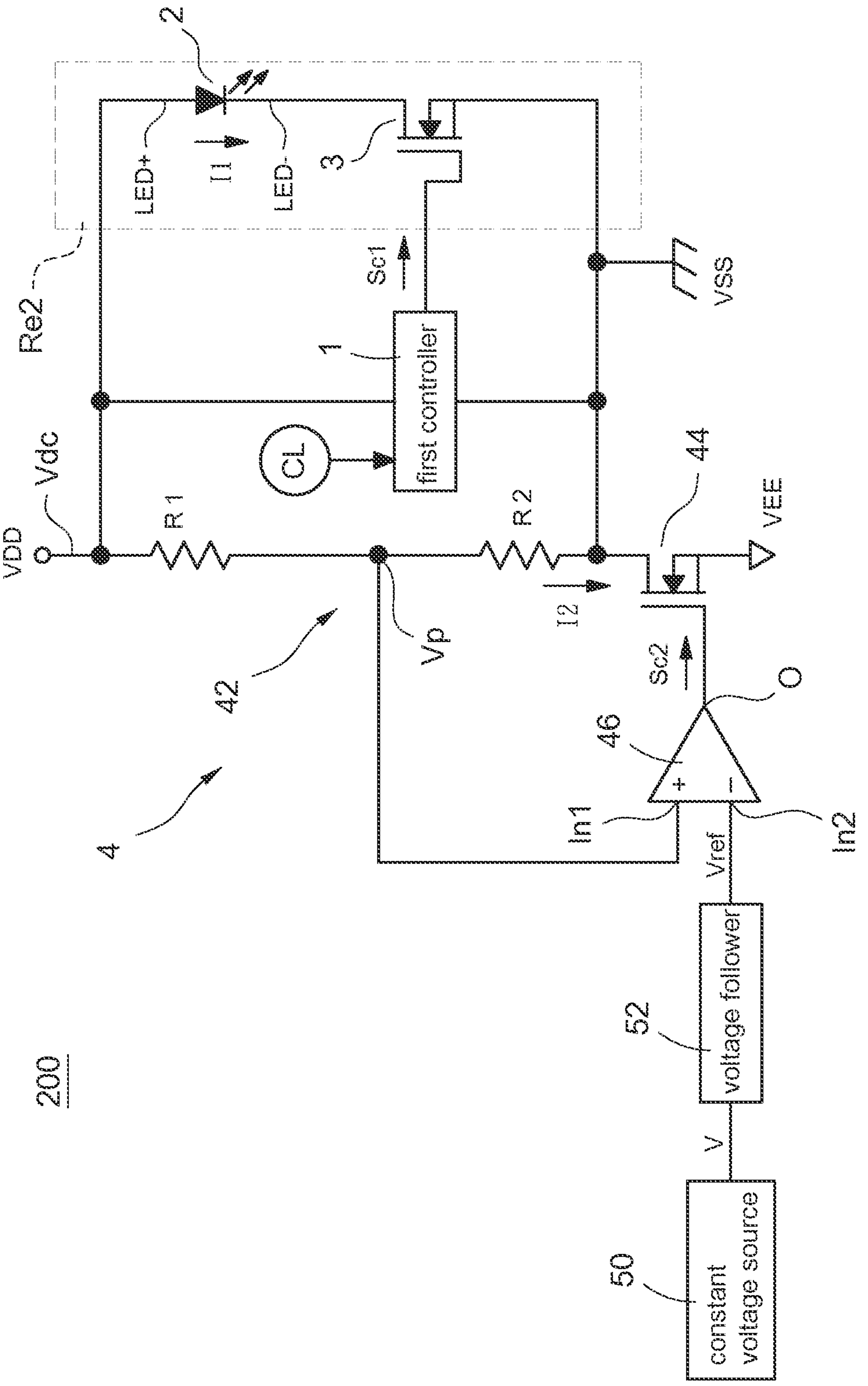
FIG. 8 shows a circuit block diagram of the light-emitting diode lamp according to another embodiment of the present disclosure.

FIG. 8 shows a circuit block diagram of the light-emitting diode lamp 200 according to another embodiment of the present disclosure. The descriptions of the elements shown in FIG. 8 which are the same as the elements shown in FIG. 2 are not repeated here for brevity. The circuit of FIG. 8 is used when the light-emitting diode lamps 200 are connected in parallel with each other. If the light-emitting diode lamps 200 are connected in parallel with each other, because the voltage of the positive terminal VDD of each of the light-emitting diode lamps 200 is fixed and the voltage of the negative terminal VSS of each of the light-emitting diode lamps 200 is also fixed, there is no need for the impedance-balancing unit 56 as shown in FIG. 2.

The present disclosure has at least the following two advantages:

1. The present disclosure improves the problem that the circuit used by the control apparatus to generate the lighting signal Vdc in the light-emitting diode lamp string system 10 is too complicated. The single impedance component 308 is connected in parallel to both ends of the controlled switch 306, and the controller 304 operates the on or off state of the controlled switch 306 so that the direct-current power 302 includes the first voltage V1 and the second voltage V2 to generate the lighting signal Vdc. Compared with the prior art, the technical solution adopted in the present disclosure is simpler and lower in cost.
2. The present disclosure improves the problem of uneven brightness of each of the light-emitting diode lamps 200 in the light-emitting diode lamp string 20. Through the impedance component 308 and the linear controller 4, the present disclosure may stabilize the first voltage V1 to a constant voltage when the lighting signal Vdc changes between the first voltage V1 and the second voltage V2, so that each of the light-emitting diodes 2 may work normally and stably, and the first controller 1 may normally identify the lighting signal Vdc. Therefore, the present disclosure has the effect of stabilizing the first voltage V1 with a simple structure.

Although the present disclosure has been described with reference to the embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure.

What is claimed is:

1. A light-emitting diode lamp string system comprising:

a light-emitting diode lamp string comprising a plurality of light-emitting diode lamps electrically connected to each other, wherein each of the light-emitting diode lamps comprises a first controller and a plurality of light-emitting diodes electrically connected to the first controller respectively; and a control apparatus receiving a direct-current power and comprising a controller, a power circuit, a controlled switch, and an impedance component, wherein the controlled switch is electrically connected to the controller and is arranged on the power circuit to form a first loop, and the impedance component is connected across the controlled switch and is arranged on the power circuit to form a second loop, and the control apparatus is electrically connected to the light-emitting diode lamp string through the power circuit, wherein when the controller performs a lighting mode, the controller switches the controlled switch to turn on or off the controlled switch, so that when the controlled switch is turned on, a first voltage is formed from the direct-current power through the first loop, and when the controlled switch is turned off, a second voltage is formed from the direct-current power through the second loop;

wherein the first voltage and the second voltage have a voltage difference and form a lighting signal; the first controller of each of the light-emitting diode lamps identifies the lighting signal to drive each of the light-emitting diodes to operate based on the lighting signal;

wherein each of the light-emitting diode lamps further comprises:

an impedance-balancing unit electrically connected to the first controller and the light-emitting diode;

wherein the impedance-balancing unit adjusts an impedance of the light-emitting diode lamp to a fixed impedance based on the direct-current power received by the light-emitting diode lamp, so that a voltage of each of the light-emitting diode lamps is similar.

2. The light-emitting diode lamp string system of claim 1, wherein the impedance component is a resistor, a variable resistor, or a zener diode.

3. The light-emitting diode lamp string system of claim 1, wherein each of the light-emitting diode lamps further comprises:

a plurality of first switches, wherein each of the first switches is electrically connected to the first controller and the light-emitting diode respectively;

a linear controller electrically connected to the first controller and the light-emitting diode;

a positive terminal electrically connected to the first controller, the light-emitting diode, and the linear controller; and a negative terminal electrically connected to the first controller, the first switch, and the linear controller, wherein each of the light-emitting diodes comprises:

an anode terminal electrically connected to the first controller and the linear controller; and a cathode terminal electrically connected to the first switch, wherein the linear controller linearly adjusts the direct-current power received from the positive terminal so that a current flowing through the light-emitting diode lamp is a fixed current, so that a brightness of the light-emitting diode corresponds to the fixed current and is a fixed brightness.

4. The light-emitting diode lamp string system of claim 3, wherein each of the light-emitting diode lamps further comprises a plurality of the impedance-balancing units; each of the impedance-balancing units is electrically connected to the light-emitting diode lamp and the first controller respectively; the first controller identifies the lighting signal to generate a first control signal based on the lighting signal and transmits the first control signal to each of the first switches to turn on or off each of the first switches to turn on or off each of the light-emitting diodes; the impedance-balancing unit is controlled by the first controller to have a first equivalent impedance; when the first controller turns on the first switch, the light-emitting diode and the first switch have a second equivalent impedance; when the first controller turns off the first switch, the impedance-balancing unit is synchronously controlled to provide the first equivalent impedance equivalent to the second equivalent impedance to perform an impedance compensation.

5. The light-emitting diode lamp string system of claim 4, wherein each of the impedance-balancing units comprises:

an inverting circuit electrically connected to the first controller; and a bypass switch electrically connected to the inverting circuit, the first controller, and the light-emitting diode, wherein the first controller turns on or off the bypass switch oppositely to the first switch through the inverting circuit, so that when the first controller turns off the first switch, the impedance-balancing unit provides the first equivalent impedance equivalent to the second equivalent impedance to perform the impedance compensation.

6. The light-emitting diode lamp string system of claim 5, wherein based on driving each of the light-emitting diodes to operate, the first controller of each of the light-emitting diode lamps synchronously controls each of the impedance-balancing units to perform the impedance compensation, to fix the first voltage supplied from the direct-current power to the light-emitting diode lamp through the first loop; when the first controller turns on the first switch, a first current from the anode terminal of the light-emitting diode to the cathode terminal of the light-emitting diode is generated; the linear controller controls a cross voltage between the positive terminal and the negative terminal to be a fixed voltage, to control the first current to be fixed, so that the brightness of the light-emitting diode corresponds to the fixed current and is the fixed brightness.

7. The light-emitting diode lamp string system of claim 6, wherein the linear controller comprises:

a voltage-dividing circuit electrically connected to the first controller, the light-emitting diode, the first switch, the bypass switch, the positive terminal, and the negative terminal, wherein the voltage-dividing circuit generates a divided voltage based on the lighting signal;

a transistor coupled between the voltage-dividing circuit and a ground terminal; and an amplifier electrically connected to the voltage-dividing circuit and the transistor, wherein the amplifier comprises:

a first input terminal electrically connected to the voltage-dividing circuit to receive the divided voltage;

a second input terminal receiving a reference voltage; and an output terminal electrically connected to the transistor, wherein the amplifier provides a second control signal to the transistor based on the divided voltage and the reference voltage to fix a size of a channel of the transistor; the amplifier adjusts a potential of the negative terminal based on a second current flowing through the transistor, to maintain the cross voltage at the fixed voltage by adjusting the potential of the negative terminal.

8. The light-emitting diode lamp string system of claim 7, wherein the linear controller further comprises:

a constant voltage source generating a constant voltage; and a voltage follower electrically connected to the constant voltage source and the second input terminal of the amplifier, wherein the voltage follower electrically isolates and amplifies the constant voltage to generate the reference voltage corresponding to the constant voltage; the voltage follower transmits the reference voltage to the amplifier through the second input terminal of the amplifier.

9. The light-emitting diode lamp string system of claim 8, wherein the voltage-dividing circuit comprises:

a first voltage-dividing resistor electrically connected to the first controller, the light-emitting diode, the bypass switch, the positive terminal, and the first input terminal of the amplifier; and a second voltage-dividing resistor electrically connected to the first voltage-dividing resistor, the first input terminal of the amplifier, the transistor, the first controller, the first switch, the bypass switch, and the negative terminal.

10. The light-emitting diode lamp string system of claim 9, wherein each of the impedance-balancing units further comprises:

an equivalent diode impedance component electrically connected to the first controller, the light-emitting diode, and the bypass switch.

* * * * *